Figure 1:
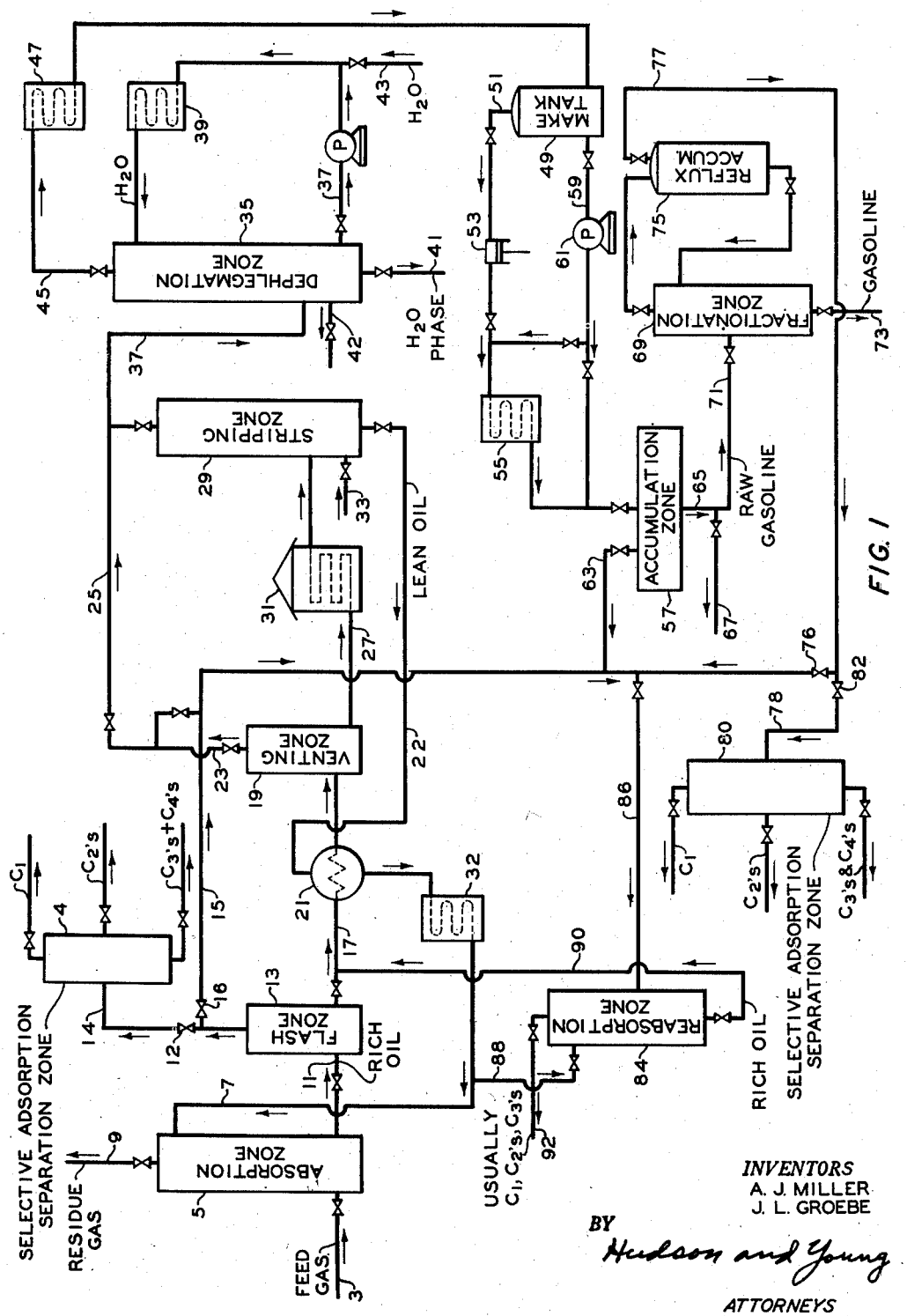

INVENTORS
A. J. MILLER
J. L. GROEBE
BY Hudson and Young
ATTORNEYS

INVENTORS
A. J. MILLER
J. L. GROEBE
BY Hudson and Young
ATTORNEYS

Patented Mar. 3, 1953

2,630,402

UNITED STATES PATENT OFFICE 2,630,402

METHOD OF SEPARATING AND RECOVERING HYDROCARBONS

Alvin J. Miller and John L. Groebe, Bartlesville, Okla., assignors to Phillips Petroleum Company, a corporation of Delaware Application June 10, 1949, Serial No. 98,368

2 Claims. (Cl. 196—8)

This invention relates to the separation and recovery of hydrocarbon materials. In one of its more specific aspects it relates to separating and recovering low-boiling normally gaseous hydrocarbon materials from a normally gaseous hydrocarbon material mixture comprising said low-boiling normally gaseous hydrocarbon materials, higher boiling hydrocarbon materials and lower boiling normally gaseous hydrocarbon materials. In another of its more specific aspects it relates to recovering gasoline from natural gas and/or other gaseous hydrocarbon streams. In still another of its more specific aspects it relates to recovering liquefiable petroleum gases and gasoline from a natural gas or other gaseous hydrocarbon streams comprising saturated and unsaturated $C_1$ to more than $C_5$ hydrocarbons and other low-boiling normally gaseous materials.

The usual process employed in recovering low-boiling normally gaseous hydrocarbon materials, such as ethane, propane, butane, and gasoline from natural gas or other gaseous mixtures containing the same is to employ a process utilizing absorption. In the usual absorption process the light hydrocarbons and gasoline are absorbed in an absorption oil, usually referred to as mineral seal oil. Subsequently the absorbed hydrocarbons are separated from the absorption oil in a series of steps during which the rich absorption oil is heated and the pressure on the absorption oil is decreased. The usual procedure is to flash the rich absorption oil withdrawn from the oil absorber to remove the lightest hydrocarbons absorbed. Next, the rich absorption oil is heated and vented so as to remove more light hydrocarbons, and finally, the absorbed hydrocarbons are removed as completely as possible from the rich absorption oil by a stripping operation, usually employing steam. During the flashing, venting and stripping operations various light hydrocarbons are removed, and also a hydrocarbon stream is produced which contains normally liquid hydrocarbons, such as those boiling in the gasoline range, absorbed in the absorption zone. By subsequent separation means the liquid hydrocarbon fraction is separated, usually by fractional distillation, into a stabilized gasoline stream and a hydrocarbon stream containing low-boiling normally gaseous hydrocarbons from which it is desirable to recover gasoline. The denuded or lean oil from which absorbed hydrocarbons have been stripped is usually recycled to the absorption zone to be used to absorb more hydrocarbons. It is usual practice to use a reabsorber in conjunction with the primary absorber. The purpose of the reabsorber is to enable one to make a better recovery of the originally absorbed hydrocarbons, since the flashing, venting and stripping operations do not make finite separations and considerable recoverable hydrocarbons, particularly $C_4$'s and $C_5$'s are flashed and/or vented. It is a usual practice to use a portion of the lean denuded absorption oil to reabsorb hydrocarbons desired to be recovered. The rich absorption oil from the reabsorber is usually recycled back through the venting and stripping operations. Also, it is a usual practice to partially condense the gaseous hydrocarbon stream resulting from the rich oil stripping operation, the liquid condensed being unstabilized gasoline which is usually subsequently stabilized in fractionation equipment. The hydrocarbon gases remaining after this partial condensation are usually passed to the reabsorber since these gases contain many light hydrocarbon materials, usually propane, butane and some $C_5$'s and heavier which are desirably reabsorbed and recovered in the reabsorber. The gaseous hydrocarbons resulting from stabilizing the gasoline may also be passed to the reabsorber for reabsorption and subsequent recovery of the desired constituents. The use of a reabsorber is advantageous because it allows for more complete recovery of the gasoline constituents and useable light hydrocarbons such as liquefiable petroleum gases. However, certain disadvantages are experienced because of the use of the reabsorber. The use of a reabsorber increases power required to operate the process, that is, to circulate absorption oil, and it also increases the requirements of heat and steam to strip the rich oil. Furthermore, use of a reabsorber, thereby increasing the absorption oil cycle, necessitates the use of larger heating and stripping equipment. If a reabsorber is used, one is limited as to the amount of ethane which may be absorbed in the original absorption operation. This is true because if the ethane is not flashed or vented it will build up in the system, and if it is flashed and/or vented from the rich oil it carries with it large amounts of propane, butane, and other gasoline constituents.

We have invented a new process for recovering low-boiling normally gaseous hydrocarbon material, such as ethane, propane, and/or butanes, and heavier gasoline constituents from a normally gaseous hydrocarbon material mixture, such as a gaseous mixture comprising saturated $C_1$ to more than $C_5$ hydrocarbons and other low-boiling normally gaseous materials, said mixture comprising said low-boiling normally gaseous hydrocarbon materials, higher boiling hydrocarbon materials, such as natural gasoline constituents, and lower boiling normally gaseous hydrocarbon materials, such as methane. The process of our invention comprises absorbing the hydrocarbons to be recovered in a liquid absorption medium, such as an absorption oil, and subsequently separating such absorbed hydrocarbons from the liquid absorption medium in steps which may include flashing, venting, stripping and/or fractional distillation. The new process of our invention utilizes selective adsorption to separate and recover light hydrocarbons such as liquefiable petroleum gases, including ethane, if desired, from gaseous hydrocarbons produced by flashing, venting, and/or stripping rich absorption oil. And, if desired, gaseous hydrocarbons produced from stabilizing gasoline recovered may be treated to separate and recover liquefiable petroleum gases including ethane, if desired.

The process of our invention has many advantages over the usual system utilizing an absorber in conjunction with a reabsorber. The reabsorber absorption oil cycle within the system is eliminated with the result that a considerable saving in power required to circulate the absorption oil is realized. Also, savings in heat and steam required for stripping the internally cycled reabsorption oil are realized. Because of the elimination of the reabsorber absorption oil cycle, stripping and heating equipment may be reduced in size while still processing the same quantity of feed gas. By using selective absorptive methods to separate and recover the lighter hydrocarbons, we find that there is a considerable reduction in the amount of vaporous hydrocarbons resulting from stripping the rich absorption oil thus reducing the amount of vapors handled by the recompressor usually used with a typical absorber-reabsorber system, or usually used in carrying out the process of our invention as will hereinafter be set forth. In addition we find that the process of our invention will recover more of the desired hydrocarbons contained in the feed than can be recovered using a typical absorber-reabsorber system. Also the process of our invention using absorption in combination with selective adsorption provides a method for absorption and recovering substantially all of the $C_2$ hydrocarbons in the feed since the problem of $C_2$ build-up is not encountered as in a system using a reabsorber as hereinbefore set forth.

It is an object of this invention to provide a method for separating and recovering hydrocarbons.

It is another object of this invention to provide a method for recovering gasoline from natural gas and/or other gaseous hydrocarbon streams.

It is another object of this invention to provide a method for separating and recovering low-boiling normally gaseous hydrocarbon materials from a normally gaseous hydrocarbon material mixture comprising said low-boiling normally gaseous hydrocarbon materials, higher boiling hydrocarbon materials and lower boiling normally gaseous hydrocarbon materials.

Still another object of our invention is to provide a method for treating a gaseous mixture comprising saturated $C_1$ to more than $C_5$ hydrocarbons and other low-boiling normally gaseous materials so as to separate and recover gasoline and $C_2$, $C_3$ and $C_4$ hydrocarbons.

Other objects and advantages of our invention will become apparent, to one skilled in the art, upon reading this disclosure.

Figure 2:
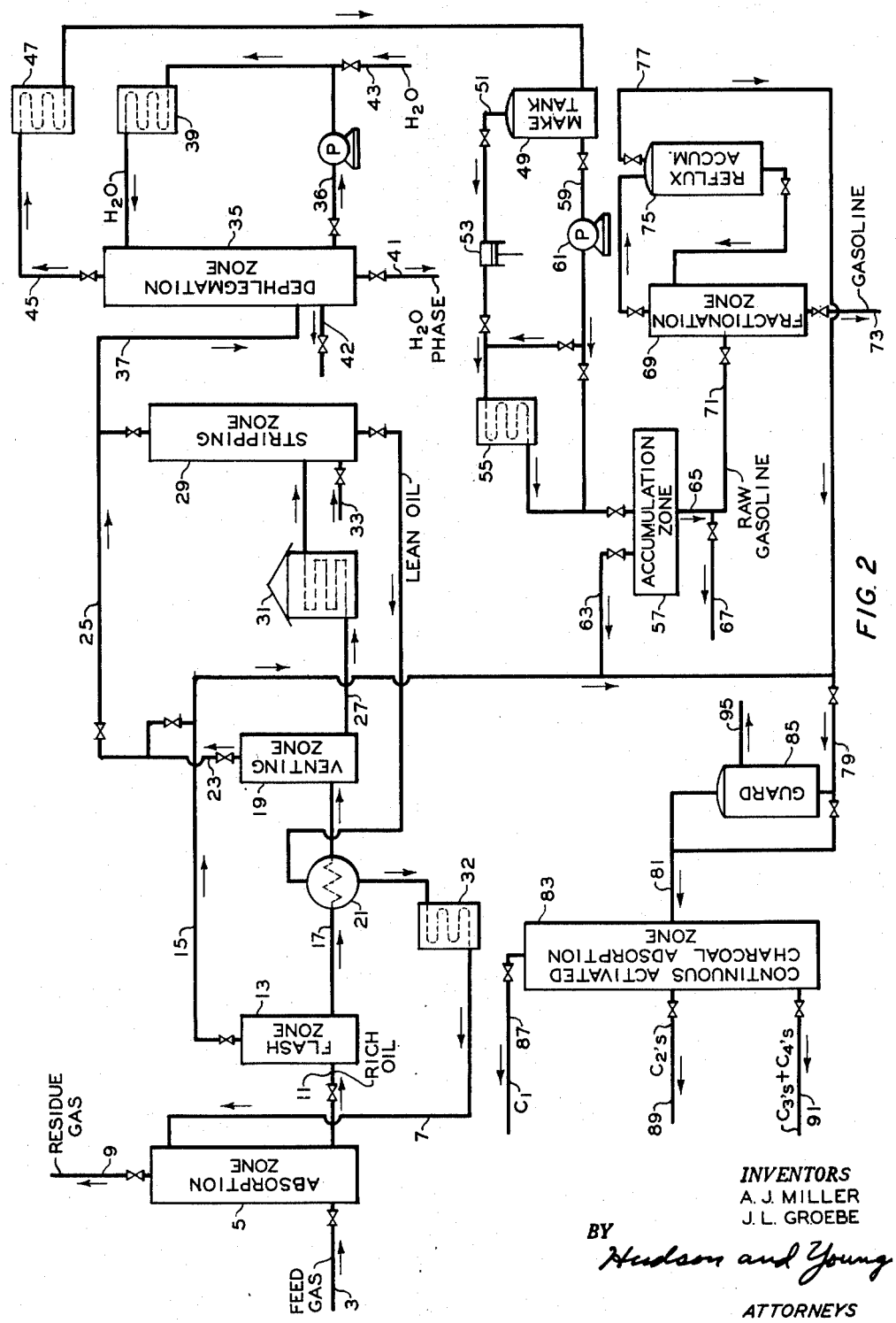

The drawings, Figure 1 and Figure 2, are a part of our disclosure. Figure 1 is a diagrammatic flow sheet showing one specific embodiment of the process of our invention using two selective adsorption separation zones. Figure 1 without the use of the adsorption zones also sets forth a typical absorber-reabsorber system. Figure 2 is a diagrammatic flow sheet setting forth a preferred specific embodiment of the process of our invention wherein an oil absorption system is used in conjunction with and cooperates with a selective adsorption separation system.

The process of our invention may be used for separating and recovering low-boiling normally gaseous hydrocarbon materials from a normally gaseous hydrocarbon material mixture comprising said low-boiling normally gaseous hydrocarbon materials, higher boiling hydrocarbon materials, and lower boiling normally gaseous hydrocarbon materials. We find that the process of our invention is particularly adaptable for recovering liquefiable petroleum gases, such as ethane, propane and/or butanes, and natural gasoline from a natural gas, said natural gas falling within the description, a gaseous mixture comprising saturated $C_1$ to more than $C_5$ hydrocarbons and other normally gaseous materials, such as $N_2$, $CO_2$, and/or $H_2S$, etc. Although we prefer to treat a natural gas by the process of our invention, we find that the process of our invention may be used to treat any hydrocarbon gas stream, for instance a refinery residue gas, so as to recover light hydrocarbons such as $C_2$'s, $C_3$'s, and $C_4$'s and gasoline.

The accompanying drawings, Figure 1 and Figure 2, set forth specific embodiments of the process of our invention. Figure 2 sets forth a preferred specific embodiment of our invention in which the feed gas stream is treated to recover light hydrocarbons and gasoline by using an oil absorption system which cooperates with a selective adsorption separation system. The following discussion is directed to treating a gaseous mixture comprising $C_1$ to more than $C_5$ hydrocarbons and other low-boiling normally gaseous materials such as $N_2$, $CO_2$, $H_2S$, etc. to separate and recover the liquefiable petroleum gases, such as ethane, propane and/or butanes and gasoline, but such discussion is not to be deemed to unduly limit the scope of our invention. If a natural gas is being treated, the hydrocarbons usually will be saturated. If a refinery gas is being treated, the hydrocarbon feed stream usually will be comprised of both saturated and unsaturated hydrocarbons. Referring now to Figure 2, the gaseous mixture is passed via line 3 into the lower portion of oil absorption zone 5 which may be comprised of one or more absorbers. In absorption zone 5 the gaseous mixture countercurrently contacts lean denuded absorption oil passed to absorption zone 5 via line 7. Absorption zone 5 is operated at any pressure suitable for absorbing a major portion of the lightest components in the feed which are desired to be absorbed, it usually being desirable to absorb at a pressure at or near the pressure at which the feed gas is available or at the pressure at which residue gas is delivered to a marker whichever is higher, since it is usually uneconomical to appreciably compress the feed gas for extraction purposes only. In treating natural gas, we find that it is preferable to operate absorption zone 5 to absorb substantially all the C₃ and heavier hydrocarbons. However, if desired, substantially all of the C₂ and heavier hydrocarbons can be absorbed since no problem of C₂ build-up in the system is encountered when using the process of our invention. The unabsorbed hydrocarbons and other low-boiling normally gaseous materials are withdrawn overhead from absorption zone 5 as residue gas via line 9.

Rich absorption oil containing hydrocarbons absorbed in absorption zone 5 is withdrawn via line 11 and passed into flash zone 13 which may comprise one or more flash tanks. Also if desired, the flashing may occur in stages, that is, the pressure on the rich absorption oil may be reduced in successive steps. The rich oil may be heated prior to or during flashing if desired. Light hydrocarbon vapors flashed from the rich oil are withdrawn from flash zone 13 via line 15. These flashed vapors, preferably comprised of methane, ethane, propane and/or butanes, are subsequently treated in a selective adsorption separation zone as will hereinafter be set forth. It is desirable that the vaporous hydrocarbons produced by flashing contain no more than a small amount of C₅ and heavier hydrocarbons. The partially denuded absorption oil is withdrawn from flash zone 13 via line 17 and is passed into a venting zone 19, which may comprise one or more vent tanks. Prior to the introduction of the partially denuded absorption oil into venting zone 19, the oil is heated by indirect heat exchange with lean denuded absorption oil in heat exchange zone 21. Heat exchange zone 21 may comprise one or more heat exchangers operating in series or in parallel.

The vaporous light hydrocarbons produced by the heating of the partially denuded absorption oil are withdrawn from venting zone 19 via line 23. They may be subsequently treated in a selective adsorption separation zone as will hereinafter be set forth, or they may be passed via line 25 into the overhead vapors resulting from final stripping of the absorption oil as will be hereinafter set forth. As the vented vapors are subsequently treated in a selective adsorption separation zone, it is desirable that they contain no more than a small amount of C₅ and heavier hydrocarbons.

Resulting partially denuded absorption oil is withdrawn from venting zone 19 via line 27 and is passed into stripping zone 29. The remaining absorbed hydrocarbons are stripped from the absorption oil, usually as completely as possible, in any suitable manner. If desired, the absorption oil prior to stripping may be heated in heater 31 which may comprise one or more heaters operating in series or in parallel. Sometimes it is desirable to strip the absorption oil by using steam, usually superheated steam which may be introduced to stripping zone 29 via line 33. Stripping zone 29 may comprise one or more stripping zones operating in series or in parallel. Lean denuded absorption oil is withdrawn from stripping zone 29 via line 7, passed in indirect heat exchange with rich oil from flash zone 13 in heat exchange zone 21, further cooled by indirect heat exchange in heat exchange zone 32 and passed back into absorption zone 5.

A dephlegmation zone to control the end point of the stripped hydrocarbon vapors is usually used in conjunction with stripping zone 29, the stripped vaporous hydrocarbons being passed to dephlegmation zone 35 via line 37. If dephlegmation zone 35 is a separate unit process, it may comprise one or more dephlegmators operating in series or parallel. If desired, the stripping and dephlegmation may be carried out in the same equipment. The dephlegmation zone 35 set forth in Figure 2 utilizes water to control the end point of the overhead vapors. The heated water which has been directly contacted with the hydrocarbon vapors in dephlegmation zone 35 is withdrawn via line 36 and pumped back into the upper portion of dephlegmation zone 35 after it has been cooled in heat exchange zone 39. A water phase is withdrawn from dephlegmation zone 35 via line 41 and condensed hydrocarbons via line 42. Makeup water may be added via line 43.

The uncondensed hydrocarbon vapors are withdrawn from dephlegmation zone 35 via line 45 and are passed into heat exchange zone 47 wherein they are partially condensed. The hydrocarbons, vaporous and liquid, are then passed to what is usually referred to as a make tank 49. Since it is usually desirable to strip at relatively low pressures, to aid the stripping operation, we find it advantageous to recompress and cool the stripped hydrocarbons so as to liquefy more of the gasoline constituents contained in the stripped hydrocarbon vapors. Vapors are withdrawn overhead from make tank 49 via line 51. These vapors are compressed in compressor 53, cooled in heat exchange zone 55 and passed to accumulation zone 57. The liquid hydrocarbons condensed in heat exchange zone 47 are withdrawn from make tank 49 via line 59 and are pumped into accumulation zone 57 by pump 61. If desired, the liquid hydrocarbons may be cooled in heat exchange zone 55 prior to their introduction into accumulation zone 57. Of course, the treatment of the stripped hydrocarbons to prepare them for further treatment to recover natural gasoline and liquefiable petroleum gases may be carried out in any manner desired. The condensing, compressing, cooling and accumulation may comprise one or more batteries of equipment necessary to perform the operations.

Vaporous hydrocarbons preferably containing no more than a small amount of C₅ and heavier hydrocarbons are withdrawn from accumulation zone 57 via line 63 for further treatment in a selective adsorption separation system as will hereinafter be set forth. The liquid hydrocarbons in accumulation zone 57 are the unstabilized gasoline constituents which were originally absorbed from the feed gas. They may be withdrawn from accumulation zone 57 and the system via lines 65 and 67 to be used as desired, or they may be withdrawn from accumulation zone 57 via line 65 and passed into fractionation zone 69 via line 71 wherein the gasoline is stabilized by fractionally distilling off light hydrocarbons. Fractionation zone 69 is usually referred to as a gasoline stabilizer. Fractionation zone 69 may comprise one or more stabilizers operating in series or in parallel. Stabilized gasoline is withdrawn from fractionation zone 69 via line 73. Reflux accumulator 75 is used in conjunction with fractionation zone 69 to supply reflux. The light hydrocarbons removed from the raw gasoline so as to stabilize it are withdrawn from reflux accumulator 65 via line 77 and are subsequently treated in a selective adsorption separation zone as will be hereinafter set forth. It is desirable that this hydrocarbon stream contain no more than a small amount of $C_5$ and heavier hydrocarbons.

The light hydrocarbon streams from flash zone 13, venting zone 19, if desired, accumulation zone 57 and reflux accumulator 75 are passed via lines 79 and 81 into selective adsorption separation zone 83. Prior to the introduction of the light hydrocarbon streams into selective adsorption separation zone 83, we find it desirable to pass the light hydrocarbon streams through a guard 85 in order to remove high-boiling hydrocarbons such as entrained adsorption oil. $C_5$ and heavier hydrocarbon removed by the guarding operation are withdrawn via line 95 upon regeneration of the adsorbent used in guard chamber 85. In connection with this guarding operation, we find that we can employ the method taught by C. R. Ringham and R. K. Simms in copending application, Serial No. 106,228, filed July 22, 1949. $C_5$ and heavier hydrocarbons, such as mineral seal oil, contaminate and poison selective adsorbents such as activated-charcoal, silica gel, etc. It is difficult to strip high-boiling hydrocarbons from the selective absorbents so as to regenerate them. Ringham and Simms teach a guarding method wherein a fixed bed of adsorbent, preferably activated-charcoal is used to selectively adsorb $C_5$ and heavier hydrocarbons, keeping them from entering the selective adsorption separation zone. Their method of regenerating the fixed beds can advantageously be used in our process, that is, the hot regenerating gases, preferably bottoms make gas from separation zone 83, may be passed into guard chamber 85 to regenerate same and thence to stripping zone 29. If the light hydrocarbons passed to selective adsorption zone 83 contain no more than a small amount of $C_5$ and heavier hydrocarbons, the guarding operation is usually unnecessary, and it is preferable that they contain no more than a small amount of such hydrocarbons. Selective adsorption separation zone 83 may comprise any suitable selective adsorption separation system such as batch fixed bed, cyclic fixed bed or fluidized systems, utilizing activated-charcoal, silica gel, etc., for instance the cyclic fixed bed system taught by R. D. Bauer in copending application, Serial No. 101,611, filed June 27, 1949. Bauer teaches a cyclic separation system wherein relatively pure hydrocarbon product streams are produced by employing a unique "refluxing" step as one of the cycles of operation. However, we prefer to use one or more continuous activated-charcoal adsorbers, utilizing a continuous moving bed of activated-charcoal, such preferred separation means employing a selective adsorption zone, stripping with indirect heat furnished by Dowtherm and/or direct heat furnished by steam and/or heated product gas in a stripping zone and subsequent cooling of the stripped charcoal in a cooling zone prior to its reintroduction into the adsorption zone. If a continuous activated-charcoal adsorber is used, we find that it is preferable to operate it at a pressure in the range from 0 to 480 pounds per square inch absolute. Selective adsorption separation zone 83 may be operated so as to separate and recover a $C_1$ hydrocarbon stream which is withdrawn via line 87, a $C_2$ hydrocarbon stream which is withdrawn via line 89 and a $C_3$ and $C_4$ hydrocarbon stream which is withdrawn via line 91. As will be evident to one skilled in the art, any desired light hydrocarbon streams may be produced, for instance, selective adsorption separation zone 83 may be operated so as to cut between the $C_2$ and $C_3$ hydrocarbons, separating and recovering a $C_1$ and $C_2$ hydrocarbon stream and a $C_3$ and $C_4$ hydrocarbon stream.

Referring now to Figure 1 which diagrammatically sets forth a modification of the process of our invention, two selective adsorption separation zones are used in conjunction with an absorber-reabsorber system so as to increase the recovery of light hydrocarbons and gasoline. It is to be noted that this modification of the process of our invention may be used with existing equipment. Also, Figure 1, without the two selective adsorption separation zones, diagrammatically shows a usual absorber-reabsorber system, primarily used to treat a gaseous mixture comprising $C_1$ to more than $C_5$ hydrocarbons and other low-boiling normally gaseous materials, such as $N_2$, $CO_2$, and/or $H_2S$, etc., so as to separate and recover light hydrocarbons and gasoline. If a natural gas is being treated it will usually be comprised of saturated hydrocarbons, while if a refinery gas is being treated, the feed stream usually will be comprised of both saturated and unsaturated hydrocarbons. With reference to Figure 1, the following discussion is directed to treating such gaseous mixtures. However, the following discussion is not to be deemed to unduly limit the scope of our invention. The same reference characters are used on Figure 1 as were used on Figure 2 where the same equipment is depicted, which equipment performs essentially the same operation. Absorption zone 5, flash zone 13, heat exchange zone 21, venting zone 19, heating zone 31, stripping zone 29, dephlegmation zone 35, heat exchange zone 47, make tank 49, pump 61 and compressor 53, heat exchange zone 55, accumulation zone 57, fractionation zone 69 and reflux accumulation zone 75, and heat exchange zone 32 perform the same function and may comprise the same equipment as they did in the prior discussion referring to the process of our invention as set forth in Figure 2. In operating by the modification of the process of our invention the vaporous hydrocarbons flashed from the rich oil in flash zone 13 are passed via line 14 to a selective adsorption separation zone 4. A guard chamber (not shown) may be used in conjunction with separation zone 4, see discussion of the guard chamber used in conjunction with separation zone 83 in the discussion of Figure 2. Selective adsorption separation zone 4 may comprise the same separation equipment as was hereinbefore discussed in connection with separation zone 83, and the vaporous hydrocarbons may be separated into the same streams, for instance, a $C_1$ hydrocarbon stream, a $C_2$ hydrocarbon stream and a $C_3$ and $C_4$ hydrocarbon stream, or into a $C_1$ and $C_2$ hydrocarbon stream and a $C_3$ and $C_4$ hydrocarbon stream. The vaporous hydrocarbons withdrawn from reflux accumulator 75 via line 77 are passed via line 78 into a selective adsorption separation zone 80 which separation zone may comprise the same equipment as separation zones 83 and 4, and may be operated in the same manner so as to produce the same hydrocarbon streams as desired, see the discussion hereinbefore in connection with separation zone 83 and separation zone 4. If the vaporous hydrocarbon materials passed to separation zone 80 contain no more than a small amount of $C_5$ and heavier hydrocarbons, that is, said vaporous hydrocarbon materials being comprised of hydrocarbons having no more than four carbon atoms per molecule, guarding of separation zone 80 is usually not required. The vaporous materials from reflux accumulator 75 usually do not contain entrained absorption oil. In operating by the above modification of the process of our invention valves 16 and 76 are closed and valves 12 and 82 are open. Reabsorption zone 84 which may comprise one or more reabsorbers is used to reabsorb vaporous hydrocarbons withdrawn from accumulation zone 57 via line 63. Vaporous hydrocarbons are vented from venting zone 19 and may be passed to reabsorption zone 84 or they may, as before, be combined with the overhead vapors from stripping zone 29. The vaporous hydrocarbons are passed into reabsorption zone 84 via line 86 wherein they countercurrently contact cooled lean denuded absorption oil which is passed to reabsorber 84 via lines 22 and 88 from stripping zone 29. Rich absorption oil, containing the hydrocarbons absorbed in reabsorption zone 84, is withdrawn via line 90 and passed into the partially denuded absorption oil withdrawn from flash zone 13. Unabsorbed hydrocarbons are withdrawn from reabsorption zone 84 via line 92 as residue gas to be used as desired. In operating by the above modification of the process of our invention the same advantages to a lesser degree are realized as are realized in operating by the process set forth in Figure 2. In the process set forth in Figure 2 the reabsorption oil cycle is eliminated completely, while in the modified process set forth in Figure 1 the reabsorption oil cycle is reduced. As stated hereinbefore, the modification of the process of our invention may be used advantageously in plants already in existence. If desired, any of the individual vaporous streams from the flash zone, venting zone, accumulation zone and reflux accumulation zone may be treated in suitable selective adsorption separation equipment. In new plants we prefer to eliminate the reabsorption oil cycle completely by practicing our invention according to the process set forth in Figure 2.

Referring again to Figure 1, with valves 12 and 82 closed and valves 16 and 76 open, that is, eliminating the two selective adsorption separation zones, Figure 1 sets forth the usual absorber-reabsorber system used to treat a gaseous mixture to separate and recover light hydrocarbons and gasoline. The vaporous hydrocarbons from flash zone 13, accumulation zone 57, reflux accumulation zone 75 and venting zone 19, if desired, are passed via line 86 to reabsorption zone 84. Reabsorption zone 84 is used to increase the recovery of gasoline and light hydrocarbons. Of course, a relatively large reabsorption oil cycle is used in order to have efficient recovery, and with such a system one is very limited as to the amount of ethane which may be originally absorbed in oil absorption zone 5 since ethane will build up in the system if not flashed.

Following is an example of the process of our invention operating in our preferred manner as set forth in Figure 2. Also, we include a comparable example, operating in the usual manner, using an oil absorber-reabsorber system as set forth in Figure 1, that is, using no selective adsorption separation zones. In other words, valves 12 and 82 are closed and valves 16 and 76 are open, reabsorption zone 84 handling the vaporous hydrocarbons from flash zone 13, accumulation zone 57 and reflux accumulation zone 75.

Accompanying Tables I and II are a part of this disclosure and are a part of this example. The quantities, compositions, temperatures, pressures, etc. set forth in this example are not to unduly limit the scope of our invention.

Table I sets forth the composition and quantity of the feed stream to absorption zone 5, the product streams produced by the preferred process of our invention and various intermediate process streams. The quantity of absorption oil used, mineral seal oil, is set forth. Oil absorber 5 is operated at a pressure of 263 pounds per square inch absolute and at a temperature of 100° F. Flash tank 13 is operated at a pressure of 173 pounds per square inch absolute and at a temperature of 100° F. Reflux accumulator 75 is operated at a pressure of 463 pounds per square inch absolute and at a temperature of 100° F. Accumulator 57 is operated at a pressure of 213 pounds per square inch absolute and at a temperature of 90° F. Continuous activated-charcoal adsorber is operated at a pressure of 160 pounds per square inch absolute.

Table II sets forth the results of treating the same feed gas mixture by the usual process as diagrammatically set forth in Figure 1, that is, using no selective adsorption separation equipment. Table II gives the quantity and composition of the feed stream, product streams produced and various intermediate process streams. Also, the quantity of absorption oil, mineral seal oil, used in oil absorber 5 and oil reabsorber 84. Oil absorber 5 is operated at a pressure of 263 pounds per square inch absolute and at a temperature of 100° F. Flash tank 13 is operated at a pressure of 173 pounds per square inch absolute and at a temperature of 100° F. Reflux accumulator 75 is operated at a pressure of 463 pounds per square inch absolute and at a temperature of 100° F. Accumulator 57 is operated at a pressure of 213 pounds per square inch absolute and at a temperature of 90° F. Reabsorber 84 is operated at a pressure of 168 pounds per square inch absolute and at a temperature of 100° F.

A comparison of the results as set forth in Tables I and II show the advantage of operating by our preferred process. For instance, comparing the total production of the two processes, that is, stream 73 of Table II with streams 73 and 91 of Table I, it is noted that the total production in operating by the preferred process of our invention is considerably increased. Also, in comparing stream 37 of Table II with stream 37 of Table I, it is noted that there are considerably less of the light constituents in stream 37 of Table I, which results in a considerable reduction in the amount of vapors handled by recompressor 53 in operating by the preferred method of our invention as set out in Figure 2, and also a considerable reduction in the vapors withdrawn from accumulator 57 as shown by the volume of stream 63 of Table I. It is also to be noted that the absorption oil circulation is reduced in operating by our preferred method which will result in an appreciable saving in power required to circulate the lean denuded oil and in the heat and/or steam required for stripping the absorption oil. Furthermore, the equipment is reduced in size.

As will be evident to those skilled in the art, various modifications of this invention can be made, or followed, in the light of this disclosure and discussion, without departing from the spirit or scope of the disclosure or from the scope of the claims.

Table I

[Operation According to Method Set Forth by Fig. 2: Basis, Mols/Day.]

| Component | Stream | | | | | | | | | | | | | | |
|---|---|---|---|---|---|---|---|---|---|---|---|---|---|---|---|
| | 3 | 9 | 7 | 15 | 27 | 37 | 63 | 65 | 73 | 77 | 79 | 91 | 89 | 87 | 95 |
| $N_2$ | 28,649 | 28,649 | ---- | 0 | 0 | 0 | 0 | 0 | 0 | 0 | 0 | 0 | 0 | 0 | 0 |
| $CO_2$ | 7,642 | 7,343 | ---- | 106 | 193 | 193 | 114 | 79 | 0 | 79 | 299 | 0 | 59 | 240 | 0 |
| $H_2S$ | 6,322 | 5,067 | ---- | 114 | 1,141 | 1,141 | 233 | 908 | 0 | 908 | 1,255 | 836 | 419 | 0 | 0 |
| $CH_4$ | 214,217 | 207,654 | ---- | 3,183 | 3,380 | 3,380 | 2,413 | 967 | 0 | 967 | 6,563 | 0 | 0 | 6,563 | 0 |
| $C_2H_6$ | 45,087 | 39,088 | ---- | 797 | 5,202 | 5,202 | 1,438 | 3,764 | 0 | 3,764 | 5,999 | 60 | 5,939 | 0 | 0 |
| $C_3H_8$ | 32,185 | 19,155 | ---- | 574 | 12,456 | 12,456 | 1,452 | 11,004 | 9,542 | 1,462 | 3,488 | 3,450 | 38 | 0 | 0 |
| $i$-$C_4H_{10}$ | 3,713 | 484 | ---- | 64 | 3,165 | 3,165 | 152 | 3,013 | 3,013 | 0 | 216 | 216 | 0 | 0 | 0 |
| $n$-$C_4H_{10}$ | 12,719 | 206 | ---- | 193 | 12,320 | 12,320 | 436 | 11,884 | 11,884 | 0 | 629 | 629 | 0 | 0 | 0 |
| $i$-$C_5H_{12}$ | 2,174 | 0 | ---- | 13 | 2,161 | 2,161 | 32 | 2,129 | 2,129 | 0 | 45 | 5 | 0 | 0 | 40 |
| $n$-$C_5H_{12}$ | 4,349 | 0 | ---- | 18 | 4,331 | 4,331 | 49 | 4,282 | 4,282 | 0 | 67 | 0 | 0 | 0 | 67 |
| $C_6H_{14}$ | 3,385 | 0 | ---- | 4 | 3,381 | 3,381 | 14 | 3,367 | 3,367 | 0 | 18 | 0 | 0 | 0 | 18 |
| $C_7H_{16}$ | 1,695 | 0 | ---- | 0 | 1,695 | 1,695 | 3 | 1,692 | 1,692 | 0 | 3 | 0 | 0 | 0 | 3 |
| M. S. Oil | 0 | 0 | 71,600 | 0 | 71,601 | 0 | 0 | 0 | 0 | 0 | 0 | 0 | 0 | 0 | 0 |
| Total | 362,137 | 307,646 | 71,600 | 5,066 | 121,025 | 49,425 | 6,336 | 43,089 | 35,909 | 7,180 | 18,582 | 5,196 | 6,455 | 6,803 | 128 |
| S. C. F. D | 137,250,000 | 116,598,000 | | | | | | | | | | | | | |
| Sp. Gr | 0.9022 | 0.7469 | | | | | | | | | | | | | |
| Gal./Day | | | 2,290,000 | | | | | | | | | | | | |

M. S. Oil means Mineral Seal Oil, the absorption oil.

Table II

[Operation According to Method Set Out by Fig. 1, Using No Selective Adsorption Separation Zones: Basis, Mols/Day.]

| Component | Stream | | | | | | | | | | | | | | |
|---|---|---|---|---|---|---|---|---|---|---|---|---|---|---|---|
| | 3 | 9 | 7 | 15 | 88 | 27 | 37 | 22 | 63 | 65 | 73 | 77 | 86 | 90 | 92 |
| $N_2$ | 28,649 | 28,649 | ---- | 0 | ---- | 0 | 0 | ---- | 138 | 0 | 0 | 0 | 76 | 320 | 21 | 299 |
| $CO_2$ | 7,642 | 7,343 | ---- | 106 | ---- | 214 | 214 | ---- | 138 | 76 | 0 | 76 | 320 | 21 | 299 |
| $H_2S$ | 6,322 | 5,067 | ---- | 114 | ---- | 1,849 | 1,849 | ---- | 450 | 1,399 | 0 | 1,399 | 1,963 | 708 | 1,255 |
| $CH_4$ | 214,217 | 207,654 | ---- | 3,183 | ---- | 3,740 | 3,740 | ---- | 2,833 | 907 | 0 | 907 | 6,923 | 360 | 6,563 |
| $C_2H_6$ | 45,087 | 39,088 | ---- | 797 | ---- | 7,063 | 7,063 | ---- | 2,284 | 4,779 | 0 | 4,779 | 7,860 | 1,861 | 5,999 |
| $C_3H_8$ | 32,185 | 19,155 | ---- | 574 | ---- | 15,749 | 15,749 | ---- | 2,231 | 13,518 | 11,941 | 1,577 | 4,382 | 3,293 | 1,089 |
| $i$-$C_4H_{10}$ | 3,713 | 484 | ---- | 64 | ---- | 3,436 | 3,436 | ---- | 208 | 3,228 | 3,228 | 0 | 272 | 271 | 1 |
| $n$-$C_4H_{10}$ | 12,719 | 206 | ---- | 193 | ---- | 13,085 | 13,085 | ---- | 575 | 12,510 | 12,510 | 0 | 768 | 765 | 3 |
| $i$-$C_5H_{12}$ | 2,174 | 0 | ---- | 13 | ---- | 2,215 | 2,215 | ---- | 41 | 2,174 | 2,174 | 0 | 54 | 54 | 0 |
| $n$-$C_5H_{12}$ | 4,349 | 0 | ---- | 18 | ---- | 4,411 | 4,411 | ---- | 62 | 4,349 | 4,349 | 0 | 80 | 80 | 0 |
| $C_6H_{14}$ | 3,385 | 0 | ---- | 4 | ---- | 3,403 | 3,403 | ---- | 18 | 3,385 | 3,385 | 0 | 22 | 22 | 0 |
| $C_7H_{16}$ | 1,695 | 0 | ---- | 0 | ---- | 1,698 | 1,698 | ---- | 3 | 1,695 | 1,695 | 0 | 3 | 3 | 0 |
| M. S. Oil | 0 | 0 | 71,600 | 0 | 13,926 | 85,526 | 0 | 85,526 | 0 | 0 | 0 | 0 | 0 | 13,926 | 0 |
| Total | 362,137 | 307,646 | 71,600 | 5,066 | 13,926 | 142,389 | 56,863 | 85,526 | 8,843 | 48,020 | 39,282 | 8,738 | 22,647 | 21,364 | 15,209 |
| S. C. F. D | 137,250,000 | 116,598,000 | | | | | | | | | | | | | |
| Sp. Gr | 0.9022 | 0.7469 | | | | | | | | | | | | | |
| Gals./Day | | | 2,290,000 | | 445,632 | | | | | | | | | | |

M. S. Oil means Mineral Seal Oil, the absorption oil.

We claim:

1. A process for treating a gaseous mixture comprising saturated $C_1$ to more than $C_5$ hydrocarbons and other low-boiling normally gaseous materials which comprises, passing said gaseous mixture into an absorption zone and therein in the only absorption operation employed in the process directly and countercurrently contacting said mixture with lean absorption oil under conditions of temperature and pressure so as to absorb propane and heavier hydrocarbons, withdrawing an unabsorbed gaseous mixture from said absorption zone, withdrawing a resulting rich absorption oil from said absorption zone and directly and without any intermediate step reducing the pressure on same in a flash zone so as to vaporize a portion of absorbed hydrocarbons, said vaporized portion containing no more than a small amount of $C_5$ and heavier hydrocarbons; passing said vaporized portion directly to a charcoal adsorption zone so as to remove $C_5$ and heavier hydrocarbons; withdrawing a resulting rich absorption oil from said flash zone and heating and passing same into a venting zone thereby producing a vaporous hydrocarbon material; withdrawing a resulting partially denuded absorption oil from said venting zone, heating and stripping same to remove absorbed hydrocarbons, cooling and at least partially condensing resulting removed hydrocarbons and said vaporous hydrocarbon material from said venting zone to a point where existing vapor contains no more than a small amount of $C_5$ and heavier hydrocarbons and passing same into an accumulation zone; passing said vapor directly to a charcoal adsorption zone so as to remove $C_5$ and heavier hydrocarbons; withdrawing a liquid stream of hydrocarbons from said accumulation zone and passing same into a fractionation zone and therein producing a hydrocarbon vapor containing no more than a small amount of $C_5$ and heavier hydrocarbons; passing said vapor directly from a reflux accumulation zone of said fractionation zone directly to a charcoal adsorption zone so as to remove $C_5$ and heavier hydrocarbons; withdrawing a liquid stream of stabilized gasoline from said fractionation zone, withdrawing a hydrocarbon vapor stream substantially free of $C_5$ and heavier hydrocarbons from said charcoal adsorption zone and passing same directly into a continuous moving-bed activated-charcoal selective adsorption zone operating at a pressure of from 0 to 480 pounds per square inch absolute, and therein separating said last mentioned hydrocarbon vapor streams into a $C_3$ and heavier hydrocarbon stream, a $C_2$ hydrocarbon stream and a $C_1$ hydrocarbon and lighter stream.

2. The process of claim 1 wherein said hydrocarbon vapor streams passed to said continuous moving-bed activated-charcoal adsorption zone are separated into a $C_3$ and heavier hydrocarbon stream and a $C_2$ and lighter hydrocarbon stream.

ALVIN J. MILLER.
JOHN L. GROEBE.

REFERENCES CITED

The following references are of record in the file of this patent:

UNITED STATES PATENTS

| Number | Name | Date |
|---|---|---|
| 1,422,007 | Soddy | July 4, 1922 |
| 1,972,060 | Cole et al. | Aug. 28, 1934 |
| 2,183,604 | Barton et al. | Dec. 19, 1939 |
| 2,190,662 | Houdry | Feb. 20, 1940 |
| 2,388,732 | Finsterbusch | Nov. 13, 1945 |

OTHER REFERENCES

Braun, "Refiner and Natural Gasoline Manufacturer," vol. 11, No. 2, pp. 192–95 and 212–13, February 1932.

Berg., "Trans. Am. Inst. of Chemical Engineers," vol. 42, pp. 665–80 (1946).

Thornton, "Petroleum Processing," vol. 3, pp. 1052–54, November 1948.